L. C. MORGAN.
TRANSMISSION MECHANISM.
APPLICATION FILED JAN. 27, 1913.
1,102,603.
Patented July 7, 1914.
3 SHEETS—SHEET 2.
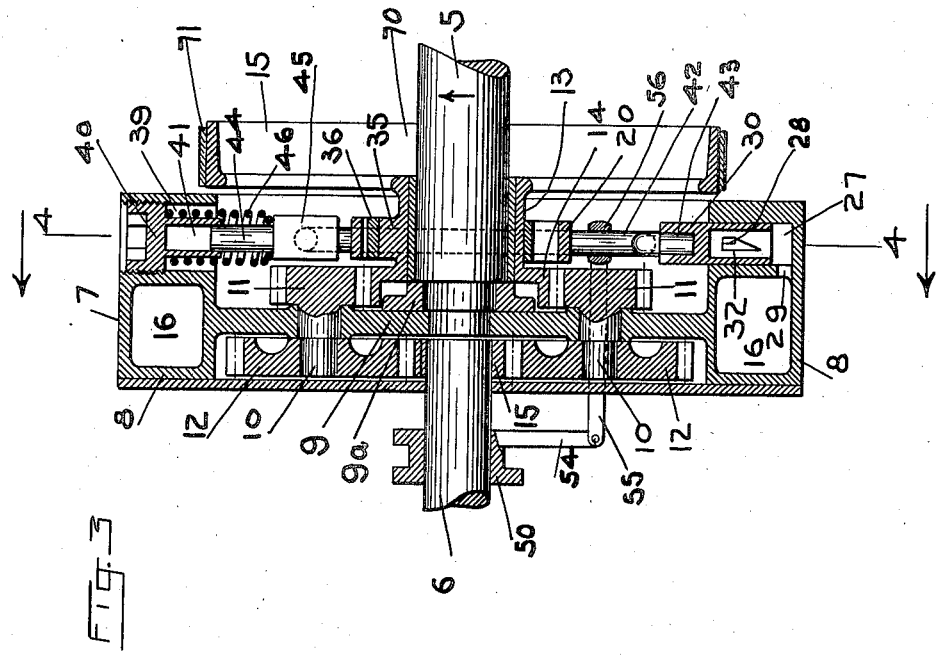
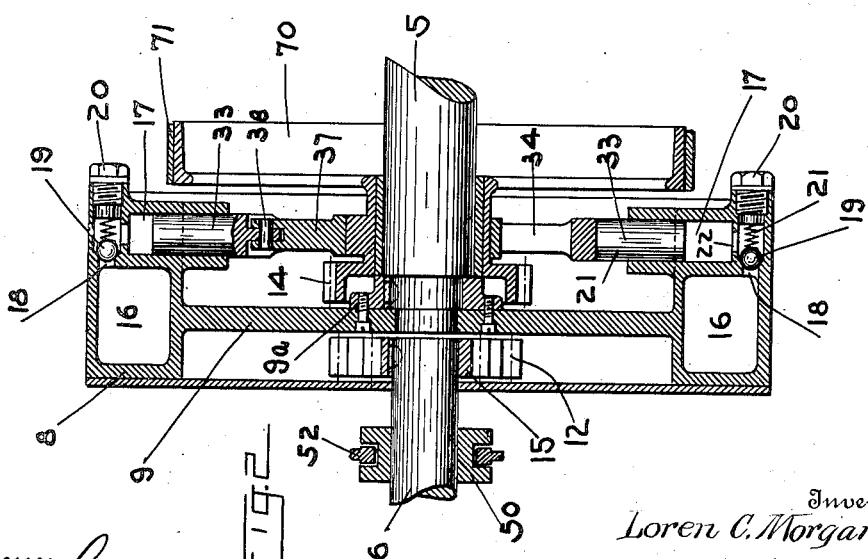
Witnesses
Inventor
Loren C. Morgan,
By Toulmin & Reed.
Attorneys L. C. MORGAN.
TRANSMISSION MECHANISM.
APPLICATION FILED JAN. 27, 1913.
1,102,603.
Patented July 7, 1914.
3 SHEETS—SHEET 3.
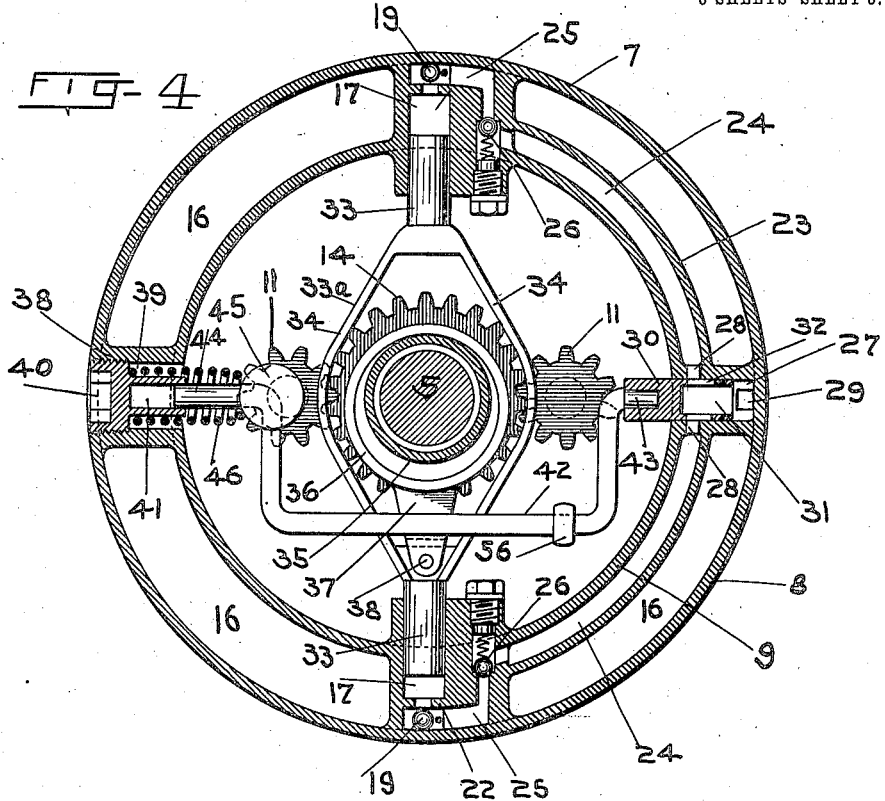
Witnesses
Cae Leon.
Harriet L. Hammaker.
Inventor
Loren C. Morgan,
By Townsend & Reed.
Attorneys

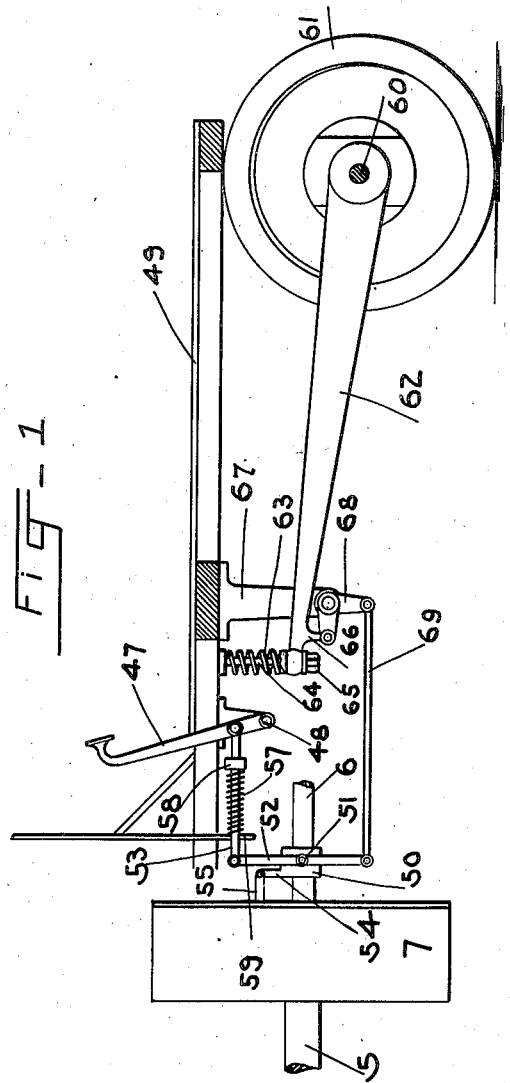

UNITED STATES PATENT OFFICE.

LOREN C. MORGAN, OF COFFEYVILLE, KANSAS, ASSIGNOR OF ONE-HALF TO ROBERT N. KING, OF DAYTON, OHIO.

TRANSMISSION MECHANISM.

1,102,603.  Specification of Letters Patent.  Patented July 7, 1914.

Application filed January 27, 1913. Serial No. 744,346.

*To all whom it may concern:*

Be it known that I, LOREN C. MORGAN, a citizen of the United States, residing at Coffeyville, in the county of Montgomery and State of Kansas, have invented certain new and useful Improvements in Transmission Mechanism, of which the following is a specification, reference being had therein to the accompanying drawing.
This invention relates to new and useful improvements in transmission mechanism.

Transmission mechanisms of the planetary gear type, which are now in very general use, are unsatisfactory because of the necessity of changing from one speed to another step by step in steps of considerable length. In such transmissions it is only practical to make from two to four changes in speed. Many attempts have been made to produce a transmission mechanism in which means are provided for obtaining gradually any degree of speed between the drive and driven shafts, thereby eliminating the objection of stepping abruptly from one speed to another, but none of these mechanisms have been entirely satisfactory.

One object of my invention is to provide a transmission mechanism having a fluid-control be means of which the speed may be gradually changed and to so construct and arrange the several parts of the mechanism that it will have the strength, the compactness and the positive operation required in actual service; and that it can be produced at a reasonable cost.

To this end it is a further object of the invention to provide a fluid transmission mechanism in which the main supporting member will have the fluid chambers formed therein and will also have the pumps, which handle the fluid, and the planetary gears mounted directly thereon; to provide such a mechanism with a plurality of pumps and a single valve to control all of said pumps;
to provide a pump-controlling valve capable of two independent movements, either of which will regulate the flow of fluid and thus control the speed of the driven member; and to provide a single actuating device to impart both of these movements to the valve.

It is also an object of the invention to provide such a mechanism having its controlling means automatically controlled, in turn, by the load on the driving shaft of an automobile.

A further object is to provide transmission gearing having a single actuating valve which may be controlled either manually, by the speed of the driving shaft, or by the load on the driven shaft.

In the accompanying drawings, Figure 1 is a detail, longitudinal, sectional view through a portion of a motor vehicle showing the application of my invention; Fig. 2 is a cross, sectional view through the transmission showing the relative positions of the plunger pistons; Fig. 3 is a similar view but taken at right angles to Fig. 2; and Fig. 4 is a sectional view taken on the line 4—4 of Fig. 3 in the direction indicated by the arrows.

Referring to the drawings there is shown a drive shaft 5 and a driven shaft 6, the latter being co-axial with the former. These shafts are connected by a transmission of the planetary type and in this instance I have shown a fly wheel 7 fixedly mounted on the end of the drive shaft adjacent the driven shaft and constituting a supporting member for the transmission devices. This wheel includes a rim 8 and a web 9, the latter being secured to the shaft 5 through the medium of a collar 9ª that is fixed on said shaft. Journaled in the web 9 on opposite sides of the shaft 5 are pins 10—10 and fixed on one end of each pin is a planet pinion 11, and fixed on the other end of each pin and on the opposite side of the web is a planet gear 12. Loosely mounted on the drive shaft 5 is a sleeve 13 and preferably formed integral on the inner end of this sleeve is a sun gear 14 which is in mesh at all times with the planet pinions 11. Fixedly mounted on the inner end of the driven shaft 6 is a sun pinion 15 which is always in mesh with the planet gears 12. It will thus be observed that upon rotation of the drive shaft 5 in a positive or clockwise direction the fly wheel 7 will be likewise rotated and this fly wheel will carry with it both sets of planetary gear pinions. As a result the planetary pinions 11 will revolve loosely around the sun gear 14 and the planet gears 12 will revolve loosely around the sun pinion 15. It will thus be observed that in order to drive the driven shaft 6, it is necessary to lock or gradually connect the sun gear 14 to the shaft 5 and to accomplish this result I have provided a novel fluid-controlled mechanism. This mechanism includes a fluid chamber 16 that is formed in the rim 8 of the fly wheel and extends entirely around said rim. Formed in the rim 8 at diametrically opposite points are radially disposed pump cylinders 17—17. Although I have shown these pump cylinders as being formed integral with the rim it will, of course, be understood that they may be made separate from the rim. The fluid passes from the chamber 16 into each pump chamber 17 through an inlet port 18 which is normally closed by a check valve 19. This valve is preferably of the ball type and access to said valve may be obtained through the medium of the screw plug 20. Each valve is yieldably retained on its seat by a spring 21 that is disposed intermediate the ball and the plug. Each port 18 is disposed at the outer end of the valve chamber, and in order to prevent the ball 19 from being drawn inwardly the wall of the chamber is formed with an annular rib 22. Formed in the rim 8 is a partition 23 which extends around one side of the rim and connects the pump chambers. This partition forms resultant discharge passages 24—24 for the fluid. Each pump chamber is formed with a fluid passage 25 which communicates with the interior of said chamber and with the adjacent fluid passage 24. Disposed within each passage 25 is a check valve 26 of a construction similar to the check valve previously described.

It is necessary to control the flow of fluid to and from the pump chamber 17 so as to regulate the speed of the driven shaft. To this end the rim 8 is formed with a radially extending valve chamber 27, this chamber being disposed intermediate the pump chamber 17 and intercepting the passages 24, said chamber 27 communicating with said passages through ports 28—28. The valve chamber 27 also communicates with the fluid chamber 16 through a port 29. Mounted in the valve chamber 27 is a controlling valve 30 which is mounted for both longitudinal and oscillatory movements. This valve is formed at its outer end with an outwardly opening recess 31, the walls of the recess being formed with diametrically opposed ports 32—32 which in certain positions of said valve register with the ports 28—28.

In order to form a variable connection between the sun gear 14 and the driving shaft 5 through the medium of the fluid, there is provided a pair of plunger pistons 33—33 which operate within the respective pump chambers 17 and are rigidly connected to each other by means of a yoke 33ª, said yoke including opposed outwardly bowed arms 34—34 that embrace the driving shaft 5.

In order to reciprocate the plunger pistons 33 there is formed on the sleeve 13 an eccentric 35, and disposed around this eccentric is an eccentric strap 36 which is provided with a radial arm 37 that is pivotally connected at its outer end, as at 38, to one end of the yoke 33ª. It will thus be observed that upon rotation of the sun gear 14 the eccentric 35 will, through the strap 36 and arm 37, reciprocate the plunger pistons 33.

It will be observed that when the drive shaft 5 is at rest the controlling valve 30 will be disposed in its open position, thereby affording a free passage of fluid around the rim and into and out of the pump chambers 17. When, however, the valve 30 is moved to its innermost position, it will close the ports 28 and the passage of fluid from the fluid chamber 16 into the pump chamber 17 will be prevented and as a result the fluid within said pump chambers will constitute stops for the plunger pistons. As long as the plunger pistons are held against reciprocatory movement the sun gear 14 will be locked to the drive shaft 5, and, as above noted, the driven shaft 6 will thereby be rotated.

It is desirous to provide an automatic means for shifting the valve inwardly so as to connect the sun gear 14 to the drive shaft. To this end the rim 8 at a point diametrically opposite the valve chamber 27 is formed with a radially disposed recess 39, the outer end thereof being closed by a plug 40 which may be secured to the rim by screw threads or other suitable means. The inner end of this plug is formed with a guide 41. An oscillatory yoke 42 spans the drive shaft 5 and has its ends bent outwardly to form radially extending portions 43 and 44, respectively. The portion 43 is fixedly secured to the inner end of the valve 30 and the portion 44 has sliding engagement within the guide 41. When the valve 30 is in its initial position the ports 28—28 of the passages 24 register with the ports 32 of said valve. A weight 45 is mounted on the yoke 42 at the inner end of the outwardly turned portion 44 of said yoke and disposed between this weight and the plug 40 is a coiled spring 46. When the fly wheel is rotated the weight 45 is moved outwardly against the tension of the spring 46, this weight carrying with it the yoke 42 and the valve 30. When the weight 45 has moved outwardly a sufficient distance the ports 32 of the valve will be disposed out of register with the ports 28, thereby closing the passages 24 from the fluid chamber 16, and, as above noted, the closing of these passages causes the plunger pistons 33 to become immovable with respect to the wheel. It will be noted in this connection that when the valve 30 is open the plunger pistons 33 will operate and the driven shaft 6 will remain idle and when the valve is closed the plunger pistons are held immovable and the driven shaft 6 will be rotated at its maximum speed. By controlling the position of the valve 30 more or less fluid may be admitted to the piston chamber 17 and as a result a corresponding increase or decrease in speed of the driven shaft may be obtained. In order, therefore, to impart any degree of speed to the driven shaft 6 the ports 32 of the valve 30 are formed to provide tapering ports, the taper of each port extending toward the outer end of the valve. When the valve 30 is oscillated by means of the yoke 42 the tapering portions of the ports 32 will cause a gradual increase or decrease in the flow of fluid into and out of the pump chambers 17, thereby graduating the movements of the plunger pistons in a smooth manner, this being in contradistinction to the stepped transmission now in general use.

In order to manually oscillate the yoke 42 and thereby control the speed of the driven shaft, there is provided a lever 47 which in this instance is shown as a foot lever and is pivotally mounted, as at 48, upon the frame 49 of a motor vehicle. Slidably mounted on the driven shaft 6 is a collar 50 and fulcrumed intermediate its ends, as at 51, upon this collar is a shipper lever 52. The upper end of this lever is pivotally connected to one end of a link 53, the other end of said link being pivotally connected to the foot lever 47. Secured to the collar 50 is a radially extending arm 54 and pivoted to this arm is one end of an arm 55, the other end of said arm being formed with an eye 56 that is loosely connected with the yoke 42. The lever 47 is yieldably held in its initial position by means of a coiled spring 57 that is disposed around the link 53 between a stop 58 on said link and a stop 59 on the vehicle frame, such, for instance, as the dashboard, although any other suitable stop may be employed. This vehicle includes the usual drive axle 60 and tractor wheel 61, and associated with the housing of the rear axle is the usual torque arm 62. This torque arm, which is usually connected at its forward end to the frame, is in this instance yieldably held away from said body by means of a coiled spring 63 which is disposed around a rod 64 between the arm and the frame. An adjusting nut 65 is engaged with this rod and serves as a means to adjust the tension of this spring. As is well known the torque pressure of the arm 62 is in an upward direction, the amount of pressure being in proportion to the load. Extending downwardly from the forward end of the torque arm 62 is a short arm 66 and secured to the frame 49 of the vehicle is a bracket 67. A bell crank lever 68 is fulcrumed at its angle upon the bracket 67 and one arm of this lever is pivotally connected to the short arm 66 of the torque arm 62. The other arm of this lever is pivotally connected to one end of a link 69, the other end of said link being pivotally connected to the lower end of the shipper lever 52. When the foot lever 47 is shifted forwardly the shipper lever 52 becomes fulcrumed upon the link 69 and as a result the sleeve 50 is shifted along the driven shaft 6 and through the medium of the link 55 and yoke 42 the controlling valve 30 is oscillated to permit more or less fluid to enter the pump chambers 17. While the vehicle is traveling the speed of the driven shaft 6 will be automatically controlled by the load on the drive axle. In other words the upward movement of the torque arm 62 shifts the bell crank lever 68 and this lever in turn swings the shipper lever 52 upon its fulcrum, the fulcrum in this case being the link 53. As a result the controlling valve 30 will be oscillated in proportion to the upward movement of the torque arm 62.

From the foregoing description it will be readily apparent that in operation the drive shaft 5 causes the fly wheel 7 to rotate therewith, and this wheel carries with it both sets of planet pinions and gears 11 and 12. This causes the planet gears 12 to roll around the sun pinion 15, and the planet pinions 11 to drive the sun gear 14 at a slower speed than the drive shaft 5 but in the same direction as said shaft. In order to drive the shaft 6 it is necessary to lock any two of said gears, and, in the present instance, the sun gear 14 is locked to the shaft 5 in the following manner: Upon rotation of the fly wheel 7 the weight 45 moves away from the shaft 5 and as a result the yoke 42 shifts the valve 30 to close the ports 28—28, thereby retaining the fluid within the passages 24 and pump chambers 17. There being no outlet for the fluid, the fluid acts as a lock and prevents further outward movement of the pistons. This action locks the parts of the transmission together so as to cause the same to rotate as a unit. This results in the sun gear 14 becoming a driving gear which will rotate the two planet sets, and the gears 12 of this set will drive the sun pinion 15 and consequently the driven shaft 6. When the valve is either wide open or partially open the driven shaft is at rest or is rotating at a lower speed than the drive shaft and in the same direction. When the valve is entirely closed the driven shaft is running at its highest speed and when the valve is opened to a more or less degree the speed of the driven shaft is correspondingly decreased. In order to open the controlling valve to a more or less degree the yoke 42 is oscillated either by the foot lever 47 or through the medium of the torque arm 62, as above described, the former serving to manually control the speed of the driven shaft and the latter serving to automatically control the speed of said driven shaft in proportion to the load on the drive shaft.

In order to reverse the driven shaft 6 a brake drum 70 is fixed on the sleeve 13 and a suitable brake strap 71 is associated with said drum. It will, of course, be readily understood that when the brake strap 71 is operatively applied to the drum 70 the driven shaft 6 will be rotated in a negative direction but at a considerably less speed.

From the foregoing the operation of my invention will be readily understood and it will be observed that by this construction as soon as the throttle which controls the engine of the drive shaft is opened, the fly wheel will rotate with the drive shaft and as a result the centrifugal governor will be moved to close the valve. This movement, however, is a slow, graduated movement and results in a slow reciprocation of the plunger pistons and, consequently, a slow graduation of the speed of the driven shaft. It will also be observed that the controlling valve is capable of both longitudinal and oscillatory movements and that a single device is provided, namely, the yoke 42, for imparting either of said movements to said valve; also that the oscillatory movement of said valve results in a gradual variation in the speed of the driven shaft; and that the oscillatory movement of this valve is either controlled automatically or manually. Moreover, it will be apparent that I have provided a very strong, compact mechanism, the operation of which is positive and which conforms to the requirements of actual service; and it will also be noted that this is accomplished by mounting the pumps and the planetary gears upon the fly wheel of the supporting member, and by forming the fluid chambers in the fly wheel itself and controlling the flow of the fluid from the several pumps by means of a single valve. It will also be apparent that the arrangement is such that the pumps are always in working balance and that the gear speed is low. The construction is a simple one and can be manufactured at a low cost.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with a drive shaft and a driven shaft, of a planetary transmission gearing connecting said shafts including fluid-controlled means for controlling the speed of the driven shaft, and means to automatically control the fluid-controlling means through the resistance of the load.

2. In a motor driven vehicle, the combination, with a drive shaft, a driven shaft, and an axle connected with said driven shaft, of a fluid controlled transmission mechanism for gradually varying the speed of said driven shaft, and a device actuated by the resistance offered to the rotation of said axle to regulate said fluid-controlled transmission mechanism.

3. In a motor driven vehicle, the combination, with a drive shaft, a driven shaft, and an axle connected with said driven shaft, of a fluid controlled transmission mechanism for gradually varying the speed of said driven shaft, and a torque arm connected with said axle and said transmission mechanism to control the latter.

4. In a motor driven vehicle, the combination, with a drive shaft, a driven shaft, and an axle connected with said driven shaft, of a fluid-controlled transmission mechanism for gradually varying the speed of said driven shaft, a torque arm connected with said axle and extending forwardly therefrom, a resilient device to resist the upward movement of the forward end of said torque arm, and a lever connection between the forward end of said torque arm and said transmission mechanism, whereby said transmission mechanism will be controlled by the vertical movement of the forward end of said torque arm.

5. The combination, with a drive shaft and a driven shaft, of a planetary transmission gearing connecting said shafts including a sun gear on the drive shaft, fluid-controlled means for variably connecting the sun gear to the drive shaft, and means for automatically controlling the fluid-controlled means to control the speed of the driven shaft through the resistance of the load.

6. The combination, with a drive shaft and a driven shaft, of planetary transmission mechanism connecting said shafts and including fluid-controlled means for controlling the speed of the driven shaft, said means including a valve, and means for automatically actuating said valve to control the speed of the driven shaft in proportion to the load.

7. The combination, with a drive shaft, and a driven shaft, and of transmission mechanism connecting said shafts including fluid-controlled means for controlling the speed of the driven shaft, said means including a valve, a lever fulcrumed upon a support adjacent the transmission mechanism, an operative connection between the valve and the lever to actuate the former upon movement of said lever in one direction, and means connected to the lever for automatically shifting the same to actuate said valve in proportion to the load.

8. The combination, with a drive shaft and a driven shaft, of a fly wheel fixed on the drive shaft and provided with a fluid chamber, a sun gear on the drive shaft, a sun pinion mounted on the driven shaft, planetary gearing carried by the fly wheel and meshing with the sun gear and pinion, said wheel being formed with a plurality of pump chambers, pistons operating in the pump chambers, a valve chamber having communication with each pump chamber and with the fluid chamber, a valve for controlling the passage of fluid between the fluid chamber and pump chambers, actuating means for the pistons operatively connected to the sun gear, and means for automatically controlling the valve to vary the speed of the driven shaft in proportion to the load.

9. The combination, with a drive shaft and a driven shaft, of a fly wheel on the drive shaft and provided with a fluid chamber, a sun gear on the drive shaft, a sun pinion on the driven shaft, planetary gearing carried by the fly wheel and meshing with the sun gear and pinion, said wheel being formed with a plurality of pump chambers, plunger pistons operating in the pump chambers, a valve chamber having communication with each pump chamber and with the fluid chamber, a valve for controlling the passage of fluid between the fluid chamber and pump chambers, actuating means for the plunger pistons operatively connected to the sun gear, said valve having separate longitudinal and oscillatory movements to open and close the valve chamber on either movement, to gradually connect the plunger pistons to the fly wheel to vary the speed of the driven shaft, a governor carried by the fly wheel and connected to the valve to control the longitudinal movement of said valve, and means for automatically oscillating the valve in proportion to the load.

10. The combination, with a drive shaft and a driven shaft, of a planetary transmission gearing connecting said shafts and including a sun gear loose on one of said shafts, fluid-controlled means for variably connecting the sun gear to the said shaft, and means for manually controlling said fluid-controlled means to control the speed of the driven shaft.

11. The combination, with a driving shaft, and a driven shaft, transmission mechanism connecting said shafts and comprising a rotary member having a fluid chamber, a plurality of fluid-controlled devices carried by said rotary member, adapted to communicate with said chamber and spaced apart circumferentially of said rotary member to regulate the speed of the driven shaft, a single valve to control the flow of fluid from said chamber to said devices, and means to actuate said valve.

12. The combination, with a driving shaft, and a driven shaft, of a transmission mechanism comprising a rotary member, a plurality of fluid-controlled devices carried by said rotary member and spaced apart circumferentially thereof to regulate the speed of the driven shaft, said rotary member having a circumferential conduit connecting said devices with an outlet, and a single valve to control the flow of fluid through said conduit to said outlet.

13. The combination, with a driving shaft, and a driven shaft, of a transmission mechanism connecting said shafts and including a plurality of fluid-controlled devices for regulating the speed of the driven shaft, a valve to control said devices, and means to actuate said valve automatically or manually.

14. The combination, with a drive shaft and a driven shaft, of a fly wheel fixed on the drive shaft and provided with a hollow rim constituting a fluid chamber, a sun gear on the drive shaft, a sun pinion on the driven shaft, planetary gearing carried by the fly wheel and meshing with the sun gear and pinion, said fly wheel being provided with a plurality of pump chambers, pistons operating in the pump chambers, a valve chamber having communication with each pump chamber and with the fluid chamber, a valve for controlling the passage of fluid between the fluid chamber and pump chambers, actuating means for the pump pistons operatively connected to the sun gear, and means for actuating the valve to vary the speed of the driven shaft.

15. The combination, with a drive shaft and a driven shaft, a fly wheel fixed on the drive shaft and provided with a fluid chamber, a sun gear loose on the drive shaft, a sun pinion fixed to the driven shaft, planetary gearing carried by the fly wheel and meshing with the sun gear and pinion, said wheel having a plurality of pump chambers, pistons operating in the pump chambers, a valve chamber having communication with each pump chamber and with the fluid chamber, a valve for controlling the passage of fluid between the fluid chamber and pump chambers, actuating means for the plunger pistons operatively connected to the sun gear, said valve having separate longitudinal and oscillatory movements to gradually open and close the valve chamber on either movement, to gradually connect the pistons to the fly wheel to vary the speed of the driven shaft, a governor carried by the fly wheel and connected to the valve to control the longitudinal movement of said valve, and means for manually oscillating the valve to vary the speed of the driven shaft.

16. The combination, with a drive shaft and a driven shaft, of a planetary transmission gearing connecting said shafts and including fluid-controlled means for controlling the speed of the driven shaft, means for automatically controlling the fluid-controlled means through the resistance of the load, and means for manually controlling the fluid-controlled means independently of said automatic-controlling means.

17. The combination, with a drive shaft and a driven shaft, of fluid-controlled means for gradually varying the speed of the driven shaft, means for automatically controlling the fluid-controlled means through the resistance of the load, and means for manually controlling said fluid-controlled means independently of said automatic-controlling means.

18. The combination, with a drive shaft and a driven shaft, of a transmission mechanism connecting said shafts and including fluid-controlled means for controlling the speed of the driven shaft, said means including a valve, a lever fulcrumed upon a support adjacent the transmission, an operative connection between the valve and the lever to actuate the former upon movement of the lever in one direction, means connected to the lever for automatically shifting the same to oscillate the valve in proportion to the load, and means connected to the lever for manually actuating the same independently of said automatic lever-actuating means.

19. The combination, with a drive shaft and a driven shaft, of fluid-controlled transmission mechanism connecting said shafts and including a valve capable of both longitudinal and oscillatory movements, either movement serving to open or close said valve.

20. The combination, with a drive shaft and a driven shaft, of fluid-controlled transmission mechanism connecting said shafts and including a valve capable of both longitudinal and oscillatory movements, either movement serving to open or close said valve according to the direction of said movement, and separately operable means for imparting said movements to said valve.

21. The combination, with a drive shaft, and a driven shaft, of fluid-controlled transmission mechanism connecting said shafts and including a valve capable of both longitudinal and oscillatory movements, either movement serving to open or close said valve according to the direction of said movement, and means for automatically imparting one of said movements to said valve and means to manually impart the other of said movements to said valve.

22. The combination, with a drive shaft, and a driven shaft, of fluid-controlled transmission mechanism connecting said shafts and including a valve capable of both longitudinal and oscillatory movements, either movement serving to open or close said valve according to the direction of said movement, a centrifugally operated device for imparting one of said movements to said valve, and a device for imparting the other movement thereto.

23. The combination, with a drive shaft, and a driven shaft, of fluid-controlled transmission mechanism connecting said shafts and including a valve capable of both longitudinal and oscillatory movements, either movement serving to open or close said valve according to the direction of said movement, a centrifugal governor connected with said valve to impart longitudinal movement thereto, and a separately operated device for imparting oscillatory movement to said valve.

24. The combination, with a drive shaft, and a driven shaft, of a fluid-controlled transmission mechanism connecting said shafts and including a valve capable of being opened and closed either by a longitudinal movement or by an oscillatory movement, and a single actuating device for imparting both movements to said valve.

25. The combination, with a drive shaft, and a driven shaft, of a fluid-controlled transmission mechanism connecting said shafts and including a valve capable of being opened and closed either by a longitudinal movement or by an oscillatory movement, a single actuating device for imparting both movements to said valve, automatic means connected with said device to cause said device to impart one movement to said valve, and other means connected with said device to cause it to impart the other movement to said valve.

26. The combination, with a drive shaft, and a driven shaft, of a fluid-controlled transmission mechanism connecting said shafts and including a valve capable of being opened and closed either by a longitudinal movement or by an oscillatory movement, a yoke capable of both an oscillatory movement and a reciprocatory movement and operatively connected with said valve, whereby either movement of said yoke will impart a similar movement to said valve, and means for imparting said movements to said yoke.

27. The combination, with a drive shaft, and a driven shaft, of a fluid-controlled transmission mechanism connecting said shafts and including a valve capable of being opened and closed either by a longitudinal movement or by an oscillatory movement, a yoke capable of both an oscillatory movement and a reciprocatory movement and operatively connected with said valve, whereby either movement of said yoke will impart a similar movement to said valve, a weight connected with said yoke and so arranged that reciprocatory movement will be imparted to said yoke by a centrifugal action, and manually controlled means for imparting oscillatory movement to said yoke.

28. The combination, with a drive shaft, and a driven shaft, of a transmission mechanism connecting said shafts and comprising a supporting member having a fluid chamber and a valve chamber, a longitudinally movable valve mounted in said valve chamber, an actuating device connected with said valve and slidably mounted on said supporting member, a weight carried by said actuating device to impart movement to the same when said support is rotated, and a spring tending to retain said valve in its normal position.

29. In a fluid transmission mechanism, the combination, with a supporting member having a valve chamber, and a recess formed therein, a controlling valve mounted in the valve chamber for both longitudinal and oscillatory movement, an actuating device having one end connected with said valve and having its other end slidably and rotatably mounted in said recess, a weight carried by said actuating device for imparting longitudinal movement thereto when said supporting member is rotated, and means for imparting rocking movement to said device, whereby said valve may be actuated either manually or by the rotation of said supporting member.

30. The combination, with a driving member, and a driven member, of transmission mechanism connecting said members and comprising a rotatable support having a fluid chamber, a plurality of pumps each communicating with said chamber through separate inlet and outlet passages, means to automatically control one of said passages, and a gear operatively connected with each of said pumps and connected with one of said members.

31. The combination, with a driving member and a driven member, of a transmission mechanism connecting said members and comprising a rotatable support having a fluid chamber, a plurality of pumps communicating with said chamber, a single valve to control the communication between said fluid chamber and the several pumps, and a gear operatively connected with said pumps to actuate the same and connected with one of said members.

32. The combination, with a driving member and a driven member, of a transmission mechanism connecting said members and comprising a rotatable support having a fluid chamber, a plurality of pumps communicating with said chamber, a single valve to control the communication between said fluid chamber and the several pumps, a gear operatively connected with said pumps to actuate the same and connected with one of said members, and means for automatically controlling said valve.

33. The combination, with a driving member, and a driven member, of a transmission mechanism connecting said members and comprising a rotatable support having a fluid chamber, a plurality of pumps carried by said support, and communicating with said fluid chamber, said pumps having their corresponding operative parts rigidly connected one to the other, and a gear operatively connected with said operative parts whereby they are caused to move simultaneously.

34. The combination, with rotatable members, of a transmission mechanism comprising a rotatable support having a hollow rim constituting a circumferential fluid receptacle and having recesses forming pump cylinders communicating with said fluid receptacle, pistons mounted within said recesses and connected with one of said rotatable members, whereby the movements of said pistons in said cylinders will control the relative movements of said rotatable member and said support.

35. The combination, with a drive shaft and a driven shaft, of a supporting member fixed on one of said shafts, a sun gear fixed to one of said shafts, a sun gear rotatably mounted on the other shaft, planetary gears carried by said supporting member, connected one to the other and meshing with the respective sun gears, said supporting member having a fluid receptacle, pumps mounted on said supporting member and connected with said receptacle, actuating means for said pumps connected with said rotatable sun gear, and means to control the connection between said pumps and said receptacle.

36. The combination, with a drive shaft and a driven shaft, of a supporting member on said driving shaft, a sun gear fixed to one of said shafts, a sun gear rotatably mounted on the other shaft, planetary gears carried by said supporting member, connected one to the other and meshing with the respective sun gears, said supporting member having a fluid receptacle, pumps mounted on said supporting member on opposite sides of the center thereof and communicating with said receptacle, the pistons of said pumps being connected one to the other and with said rotatable sun gear, whereby the movement of said sun gear actuates said pumps and said pumps control the movement of said sun gear.

37. The combination, with a drive shaft and a driven shaft, of a supporting member fixed to said driving shaft, a sun gear fixed to said driven shaft, a sun gear rotatably mounted on said driving shaft, planetary gears carried by said supporting member, connected one to the other and meshing with the respective sun gears, said supporting member having a fluid receptacle, pumps mounted on said supporting member on opposite sides of the center thereof and communicating with said receptacle, the pistons of said pumps being connected one to the other and with said rotatable sun gear, whereby the movement of said sun gear actuates said pumps and said pumps control the movement of said sun gear, and a single valve to control the said pumps.

38. The combination, with a drive shaft and a driven shaft, of a supporting member on said driving shaft, a sun gear fixed to one of said shafts, a sun gear rotatably mounted on the other shaft, planetary gears carried by said supporting member, connected one to the other and meshing with the respective sun gears, said supporting member having a fluid receptacle formed in the rim thereof, recesses formed in the rim thereof communicating with said receptacle and constituting pump cylinders, pistons mounted in said pump cylinders and connected with said rotatable sun gear, and means to control the said pumps.

39. The combination, with a driving shaft, and a driven shaft, of a supporting member mounted on said driving shaft for rotation therewith, a sun gear fixed to one of said shafts, a sun gear rotatably mounted on the other shaft, planetary gears carried by said supporting member and connected one to the other to rotate in unison and meshing with the respective sun gears, said supporting member having a fluid receptacle, pump cylinders carried by said supporting member, pistons mounted in said pump cylinders and connected with said rotatable sun gear, and means to control said pump.

40. The combination, with a driving shaft, and a driven shaft, of a supporting member mounted on said driving shaft, a sun gear fixed to one of said shafts, a sun gear rotatably mounted on the other shaft, planetary gears carried by said supporting member and connected one to the other and meshing with the respective gears, said supporting member having a fluid receptacle, pump cylinders carried by said supporting member, pistons mounted in said pump cylinders and connected with said rotatable sun gear, and a single valve to control the communication between said pumps and said fluid receptacle.

41. The combination, with a driving shaft, and a driven shaft, of a supporting member mounted on said driving shaft for rotation therewith, a sun gear fixed on one of said shafts, a sun gear rotatably mounted on the other shaft, planetary gears carried by said supporting member and connected one to the other to rotate in unison and meshing with the respective sun gears, said supporting member having a fluid receptacle, a pump cylinder carried by said supporting member and communicating with said fluid receptacle, a piston mounted in said pump cylinder and connected with said rotatable sun gear, and means to control said pump.

42. In a fluid-controlled transmission mechanism, a rotatable supporting member having a hollow rim portion forming a circumferential fluid receptacle and having recesses formed therein constituting pump cylinders and communicating with said fluid receptacle.

43. In a fluid-controlled transmission mechanism, a rotatable supporting member having a hollow rim portion forming a circumferential fluid receptacle and having radial recesses formed in said rim, constituting pump cylinders and communicating with said fluid receptacle.

44. In a fluid-controlled transmission mechanism, a supporting member having a hollow rim portion constituting a circumferential fluid receptacle, having a recess therein constituting a pump cylinder and communicating with said fluid receptacle and having another recess therein constituting a valve chamber.

45. The combination, with a drive shaft, a driven shaft, an axle connected with said driven shaft, and variable speed transmission mechanism interposed between said drive shaft and said driven shaft, of a torque arm connected with said axle and operatively connected with said transmission mechanism, whereby the speed of the driven shaft will be controlled by the movement of the torque arm.

46. The combination, with a drive shaft, a driven shaft, an axle connected with said driven shaft, and variable speed transmission mechanism interposed between said drive shaft and said driven shaft, of a torque arm connected with said axle and extending forwardly therefrom, a lever connection between the forward end of said torque arm and said transmission device to cause the movement of the forward end of said torque arm to vary the speed of said driven shaft.

47. The combination, with a drive shaft, a driven shaft, an axle connected with said driven shaft, and variable speed transmission mechanism interposed between said drive shaft and said driven shaft, of a torque arm connected with said axle and extending forwardly therefrom, a resisting device to resist the forward movement of said torque arm, a lever connection between the forward end of the torque arm and said transmission mechanism to cause said transmission mechanism to be controlled by the vertical movement of the forward end of said torque arm.

In testimony whereof I affix my signature in presence of two witnesses.

LOREN C. MORGAN.

Witnesses:
F. W. SCHAEFER,
HARRIET L. HAMMAKER.